(12) United States Patent
Kumagai et al.

(10) Patent No.: US 12,411,494 B2
(45) Date of Patent: Sep. 9, 2025

(54) MOVING BODY CONTROL SYSTEM, CONTROL APPARATUS, AND MOVING BODY CONTROL METHOD

(71) Applicant: NEC Corporation, Tokyo (JP)

(72) Inventors: Taichi Kumagai, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 18/015,664

(22) PCT Filed: Jul. 21, 2020

(86) PCT No.: PCT/JP2020/028271
§ 371 (c)(1),
(2) Date: Jan. 11, 2023

(87) PCT Pub. No.: WO2022/018826
PCT Pub. Date: Jan. 27, 2022

(65) Prior Publication Data
US 2023/0315113 A1 Oct. 5, 2023

(51) Int. Cl.
*G05D 1/00* (2024.01)
(52) U.S. Cl.
CPC ................... *G05D 1/0223* (2013.01)
(58) Field of Classification Search
CPC .................................................. G05D 1/0223
See application file for complete search history.

(56) References Cited

U.S. PATENT DOCUMENTS

| 2009/0099717 A1 | 4/2009 | Yabushita et al. |
| 2015/0231786 A1* | 8/2015 | Doi ........................ B25J 9/1605 |
| | | 700/245 |
| 2018/0267542 A1 | 9/2018 | Lamon et al. |
| 2020/0198657 A1* | 6/2020 | Manderla .............. B60W 40/13 |

(Continued)

FOREIGN PATENT DOCUMENTS

| JP | H01-223513 A | 9/1989 |
| JP | H05-297943 A | 11/1993 |
| JP | 2003-022130 A | 1/2003 |

(Continued)

OTHER PUBLICATIONS

International Search Report for PCT Application No. PCT/JP2020/028271, mailed on Oct. 6, 2020.

*Primary Examiner* — Scott A Browne
*Assistant Examiner* — Terry C Buse

(57) ABSTRACT

In order to provide a moving body control system, a control apparatus, and a moving body control method that can control travel distance in returning to a target path, the moving body control system includes a moving body and a control apparatus configured to control the moving body to follow a target path, wherein the control apparatus is configured to: calculate distance until shifting the moving body to an asymptotic-orbit for the target path by turning the moving body, at each of one or more candidate center-of-gravity velocities of the moving body, based on a position of the moving body and an angle between a moving direction of the moving body and the target path; and determine a target center-of-gravity velocity of the moving body from the one or more candidate center-of-gravity velocities based on the calculated distance.

20 Claims, 16 Drawing Sheets

(56) References Cited

U.S. PATENT DOCUMENTS

2020/0290603 A1\* 9/2020 Sadamoto ........... B60W 30/143

FOREIGN PATENT DOCUMENTS

| JP | 2007-249363 A | 9/2007 |
| JP | 2007-257094 A | 10/2007 |
| JP | 2010-092279 A | 4/2010 |
| JP | 2018-527689 A | 9/2018 |
| WO | 97/036217 A1 | 10/1997 |

\* cited by examiner

PLEASE ENTER DETAILS OF GOODS TO TRANSPORT

GOODS TO TRANSPORT : | GOODS A |

TRANSPORT SOURCE : | AREA A |

TRANSPORT DESTINATION : | SELECT TRANSPORT DESTINATION |
| AREA B |
| AREA C |
| AREA D |
| AREA E |

Fig.7

MOVING BODY CONTROL SYSTEM, CONTROL APPARATUS, AND MOVING BODY CONTROL METHOD

This application is a National Stage Entry of PCT/JP2020/028271 filed on Jul. 21, 2020, the contents of all of which are incorporated herein by reference, in their entirety.

TECHNICAL FIELD

The present invention relates to a moving body control system, a control apparatus, and a moving body control method.

BACKGROUND ART

In production sites such as a factory, transport of goods such as parts and materials to be used is inevitable. Also in distribution warehouses, transport of goods is necessary. For such transport of goods, transport robots (automated guided vehicles (AGVs)) are utilized.

A transport robot travels while following a set target path. When an obstacle is present in the path, the transport robot travels so as to swerve off the path to avoid the obstacle and then return to the target path.

PTL 1 discloses a technique for controlling a mobile robot configured to follow a virtual path, in such a manner as to minimize a deviation between the position of the mobile robot and the path.

PTL 2 discloses a technique for causing a moving body to travel so as to be continuous in terms of curvature of a travel path at target spots, in consideration of the rudder angle of the moving body in addition to the position and the attitude angle of the moving body.

PTL 3 discloses an autonomous moving body configured to determine vectors from the current position of the moving body itself to respective sub-goals and place a virtual target for move of the moving body itself in the direction of a resultant vector of vector composition of the vectors, to thereby be capable of moving to a destination smoothly.

PTL 4 discloses that, from a discrete path generated by joining N coordinate points constituting a coordinate point set, in a certain order, the coordinate value of each of N coordinate points in the discrete path is converted, and the weighted moving average of the coordinate values is calculated, to thereby create a smooth continuous path.

PTL 5 discloses that the curvature of each arc in a target path is determined according to the moving velocity of a robot configured to follow the target path.

CITATION LIST

Patent Literature

[PTL 1] JP 2018-527689 T
[PTL 2] JP H01-223513 A
[PTL 3] JP 2010-092279 A
[PTL 4] JP 2007-257094 A
[PTL 5] JP 2007-249363 A

SUMMARY

Technical Problem

A transport robot is controlled, for example, in consideration of a curvature so as not to sharp turn in a state of transporting goods when returning to a target path. Hence, the transport robot travels at a base velocity, which is generally a constant velocity, and this may require long travel distance to return to the target path.

Such a problem may be present not only for a transport robot configured to transport goods but also for a general moving body configured to follow a target path. And this problem cannot be solved even when the techniques disclosed in PTLs 1 to 5 are applied.

According to one example aspects of the present invention, a moving body control system, a control apparatus, and a moving body control method that can control travel distance in returning to a target path are provided. Note that, according to the present invention, instead of or together with the above effects, other effects may be exerted.

Solution to Problem

According to one example aspect of the present invention, a moving body control system including: a moving body; and a control apparatus configured to control the moving body to follow a target path; wherein, the control apparatus is configured to: calculate distance until shifting the moving body to an asymptotic-orbit for the target path by turning the moving body, at each of one or more candidate center-of-gravity velocities of the moving body, based on a position of the moving body and an angle between a moving direction of the moving body and the target path; and determine a target center-of-gravity velocity of the moving body from the one or more candidate center-of-gravity velocities based on the calculated distance.

According to one example aspect of the present invention, a control apparatus including: a calculation means configured to calculate distance until shifting a moving body controlled to follow a target path, to an asymptotic-orbit for the target path by turning the moving body, at each of one or more candidate center-of-gravity velocities of the moving body, based on a position of the moving body and an angle between a moving direction of the moving body and the target path; and a determination means configured to determine a target center-of-gravity velocity of the moving body from the one or more candidate center-of-gravity velocities based on the calculated distance.

According to one example aspect of the present invention, a moving body control method including: a calculation step of calculating distance until shifting a moving body controlled to follow a target path, to an asymptotic-orbit for the target path by turning the moving body, at each of one or more candidate center-of-gravity velocities of the moving body, based on a position of the moving body and an angle between a moving direction of the moving body and the target path; and a determination step of determining a target center-of-gravity velocity of the moving body from the one or more candidate center-of-gravity velocities based on the calculated distance.

Advantageous Effects of Invention

According to one example aspects of the present invention, a moving body control system, a control apparatus, and a moving body control method that can control travel distance in returning to a target path. Note that, according to the present invention, instead of or together with the above effects, other effects may be exerted.

BRIEF DESCRIPTION OF THE DRAWINGS

FIG. 7 is a diagram illustrating an example of a display screen of the transport planning apparatus according to the first example embodiment;

DESCRIPTION OF THE EXAMPLE EMBODIMENTS

Example embodiments of the present invention will be described below in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments
2. First Example Embodiment
  2.1. System Configuration
  2.2. Operation Example
3. Second Example Embodiment
  3.1. System Configuration
  3.2. Operation Example

1. Overview of Example Embodiments

First, an overview of example embodiments will be described.

Figure 1:
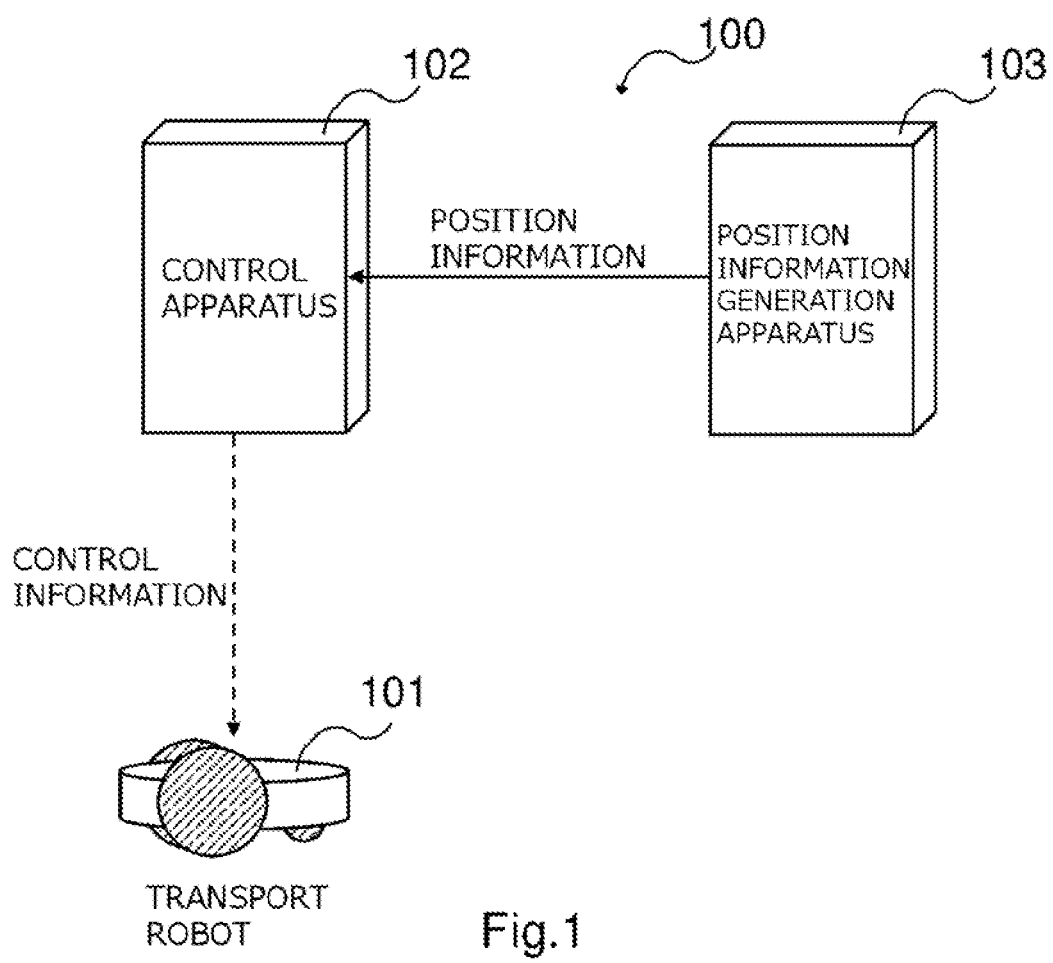
FIG. 1 is a diagram illustrating an example of a configuration of a transport system according to an example embodiment.

FIG. 1 is a diagram illustrating an example of a configuration of a transport system according to an example embodiment. A transport system 100 according to an example embodiment includes a transport robot 101, a control apparatus 102, and a position information generation apparatus 103. The transport robot 101 transports goods. The position information generation apparatus 103 generates position information of the transport robot 101 and transmits the generated position information to the control apparatus 102. The control apparatus 102 generates control information for transporting the goods by the transport robot 101, based on the position information of the transport robot 101, and transmits the generated control information to the transport robot 101. Note that the transport system 100 may include a plurality of transport robots. In this case, the position information generation apparatus 103 generates position information of each of the plurality of transport robots. The control apparatus 102 transmits control information for transporting the goods to each of the plurality of transport robots.

Figure 2:
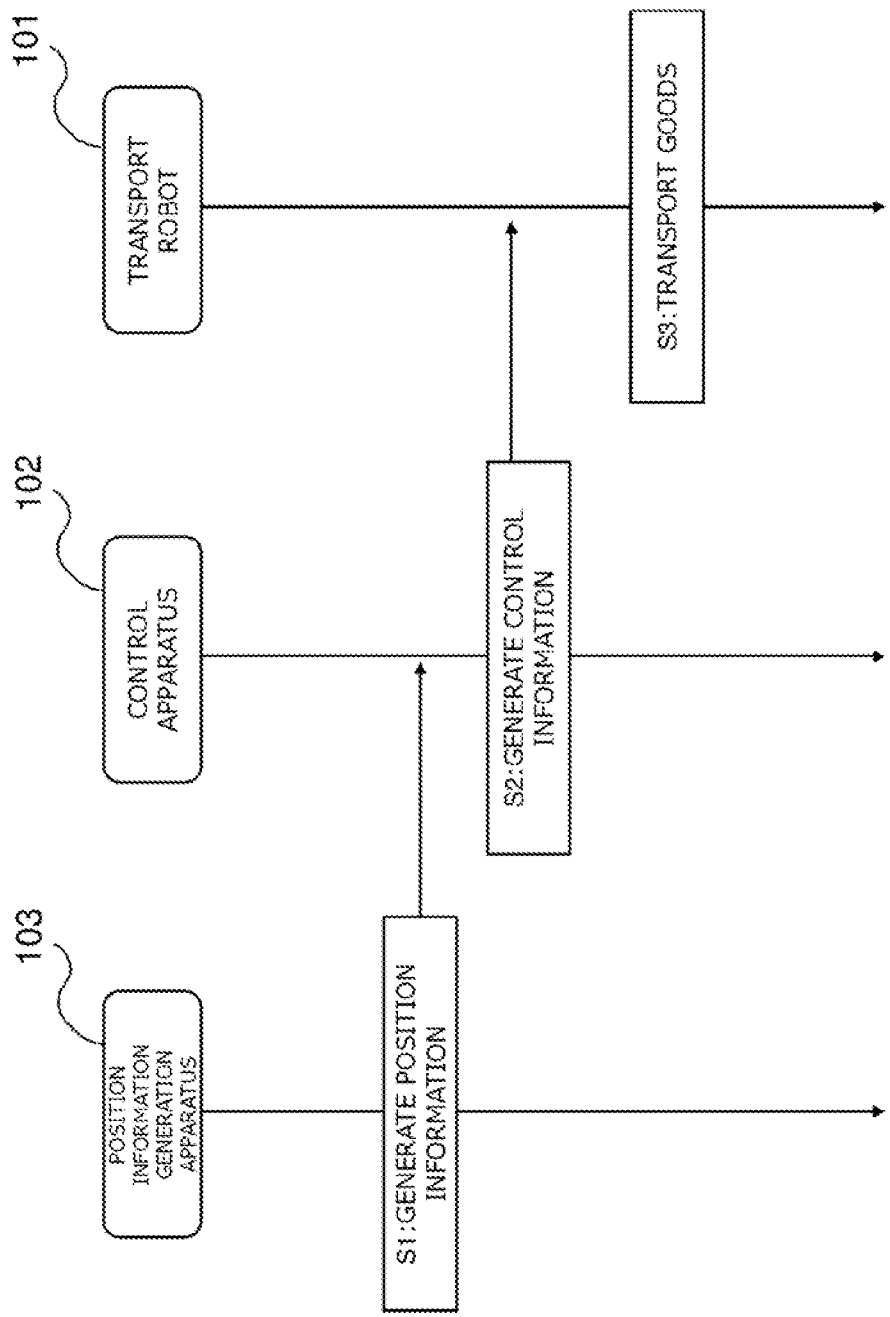
FIG. 2 is a sequence diagram illustrating an example of operation of the transport system according to the example embodiment.

FIG. 2 is a sequence diagram illustrating an example of operation of the transport system according to the example embodiment.

First, in step S1, the position information generation apparatus 103 generates position information of the transport robot 101 and transmits the generated position information to the control apparatus 102. Then, in step S2, the control apparatus 102 generates control information for transporting the goods by the transport robot 101, based on the position information, and transmits the generated control information to the transport robot 101. Then, in step S3, the transport robot 101 transports the goods, based on the received control information.

In the transport system 100, the transport robot 101 may be a type of robot configured to place goods on the robot itself or a type of robot configured to pull goods with a pulling instrument. Alternatively, two transport robots may move (transport) goods in cooperation. This allows the transport system 100 to adapt to various goods carried into a distribution warehouse or the like. For example, by the two transport robots sandwiching therebetween and moving goods, the two transport robots can transport the goods irrespective of the shape and the like of the goods. The control apparatus 102 can control the transport robots in consideration of the peripheral environment and the like as well as the situation of the two transport robots. Hence, for example, even when an obstacle is present near the transport robots (in the path of the transport robots), the control apparatus 102 can perform such control as to avoid the obstacle.

In the transport system 100, the transport robot 101 may be a type of transport robot configured to move by relying on a magnetic tape or a QR code (registered trademark) in a factory or the like in which the magnetic tape or the other is attached on a floor.

Figure 16:
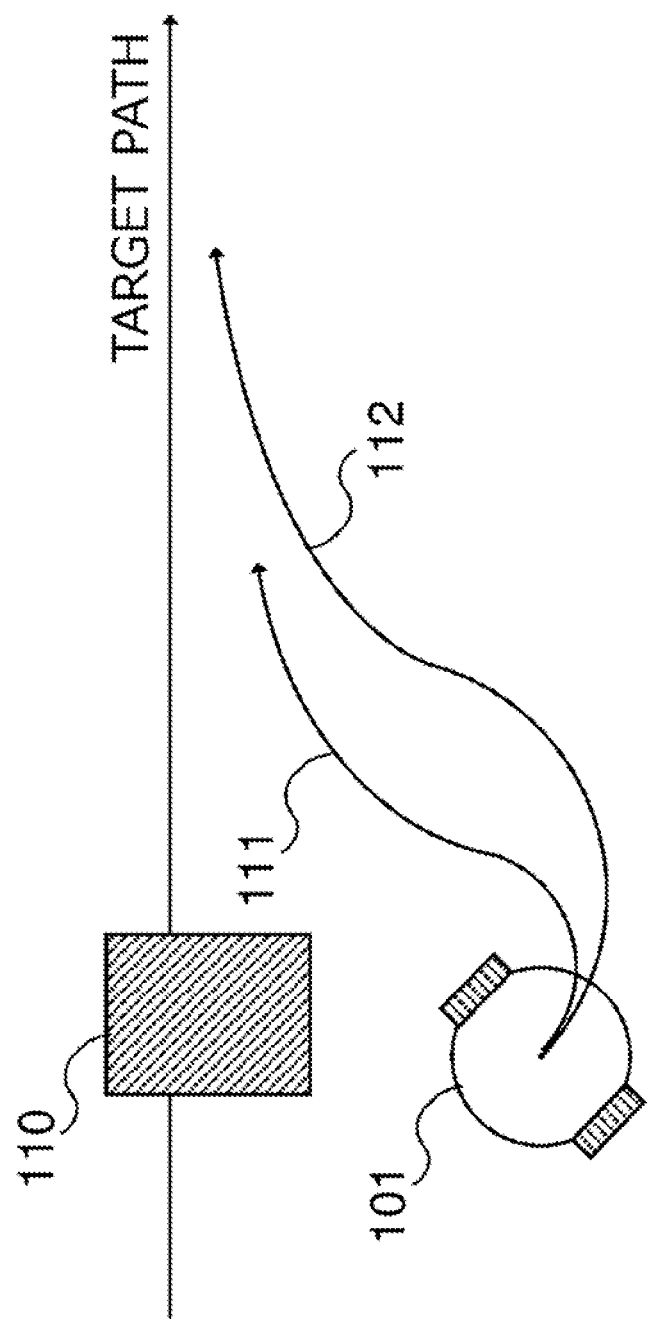
FIG. 16 is a diagram for describing an issue.

FIG. 16 is a diagram for describing an issue. As illustrated in FIG. 16, the transport robot 101 deviates from a target path by avoiding an obstacle 110 present in the target path. In such a case, the transport robot 101 is controlled to return to the target path. For example, when the transport robot 101 travels at a low speed, the transport robot 101 results in being asymptotic to the target path in such a manner as to draw a locus 111. In contrast, when the transport robot 101 travels at a high speed, the transport robot 101 results in being asymptotic to the target path in such a manner as to draw a locus 112. Hence, although the travel distance for returning to the target path differs depending on the travel velocity of the transport robot 101, control of the travel distance for the transport robot 101 to return to the target path has not been achieved heretofore. Such an issue may be present not only for a transport robot configured to transport goods but also for all kinds of moving bodies configured to follow a target path.

According to the example embodiments of the present invention, a moving body control system, a control apparatus, and a moving body control method that can control travel distance in returning to a target path are provided.

Note that the above-described overview of the example embodiments is an example, and example embodiments of the present invention are not limited thereto.

The example embodiments of the present invention are applicable not only to a transport robot configured to transport goods but a moving body configured to follow a target path.

2. First Example Embodiment

Next, a first example embodiment will be described in more detail with reference to FIG. 3 to FIG. 13.

2.1. System Configuration

Figure 3:
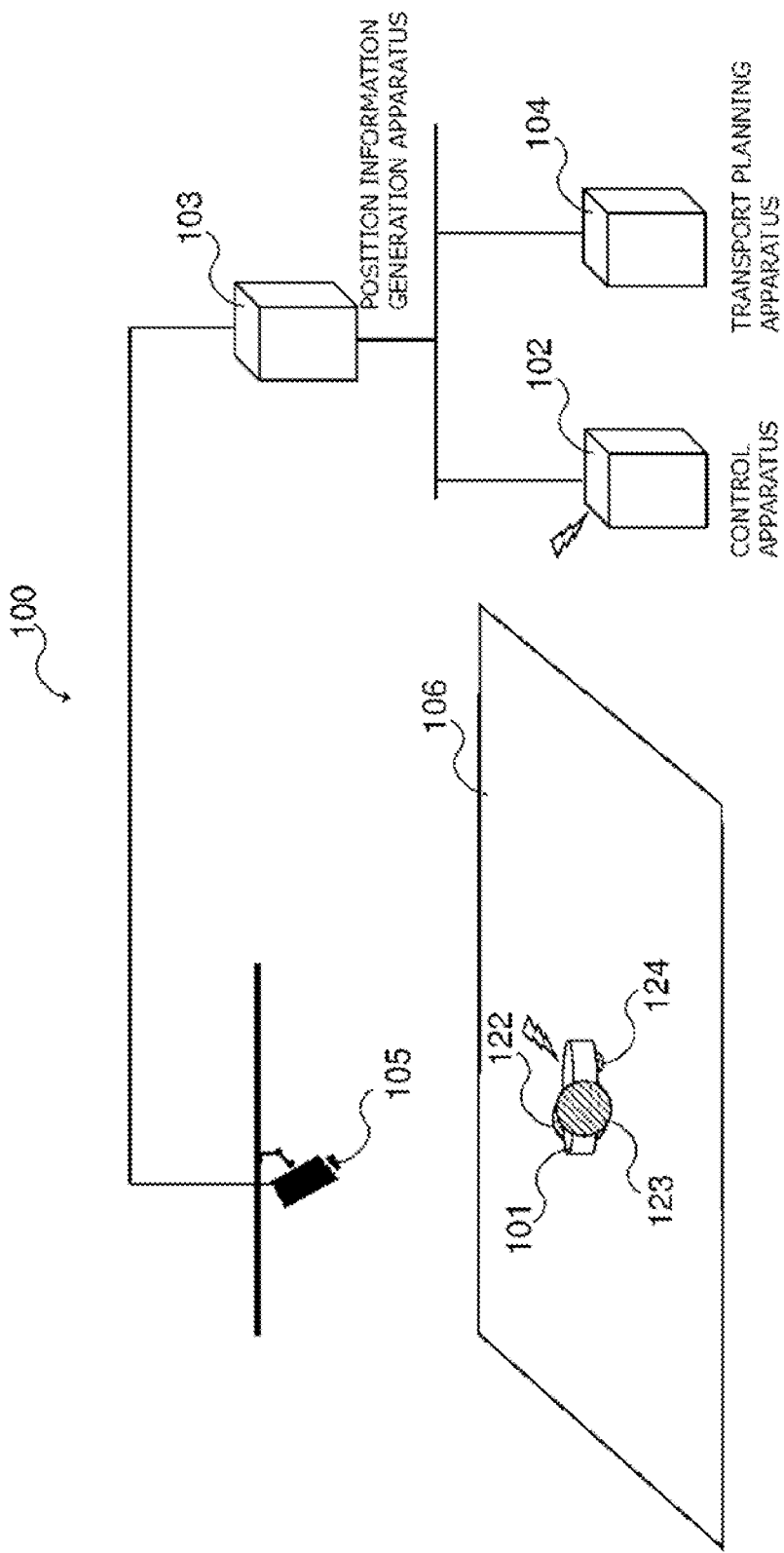
FIG. 3 is a diagram illustrating an example of a schematic configuration of a transport system according to a first example embodiment.

FIG. 3 is a diagram illustrating an example of a schematic configuration of a transport system according to the first example embodiment. A transport system 100 includes a transport robot 101, a control apparatus 102, a position information generation apparatus 103, a transport planning apparatus 104, and a camera apparatus 105. Note that the configuration illustrated in FIG. 3 is an example and is not intended to limit the number of transport robots 101 and the number of camera apparatuses 105 included in the transport system 100.

The transport robot 101 is configured to be capable of communicating with the control apparatus 102 and to move based on a control command (control information) from the control apparatus 102 to transport goods (not illustrated). The transport robot 101 includes a pair of driving wheels 122 and 123 arranged with axles of the respective driving wheels 122 and 123 passing through the center of gravity of the transport robot 101, and a non-driving wheel 124 functioning as an auxiliary wheel. The non-driving wheel 124 is rotatably attached so as to change the direction.

The camera apparatus 105 is an apparatus configured to capture an image of a field 106. The transport system 100 includes a depth camera, a stereo camera, or the like, for example. The depth camera is a camera capable of capturing a depth image with each pixel value of an image indicating the distance from the camera to an object. The stereo camera is a camera enabling, by capturing using two cameras, images of an object in a plurality of different directions, measurement related to a depth direction (height direction) of the object.

The camera apparatus 105 is installed in a ceiling, a pillar, or the like. It may be configured so that pieces of image data obtained by a plurality of camera apparatuses 105 are combined to be able to overlook the field 106.

The camera apparatus 105 is connected to the position information generation apparatus 103. The camera apparatus 105 captures an image of the field 106 at predetermined intervals (in a predetermined sampling period) and transmits image data to the position information generation apparatus 103. The camera apparatus 105 captures an image of a situation of the field 106 in real time and transmits image data including the situation to the position information generation apparatus 103.

The position information generation apparatus 103 generates information related to the position of an article in the field 106 (for example, a factory or a distribution warehouse). The position information generation apparatus 103 identifies the article located in the field 106, based on the image data received from the camera apparatus 105 and generates position information of the article. For example, the position information generation apparatus 103 generates position information of the transport robot 101.

The position information generation apparatus 103 analyzes the image data acquired from the camera apparatus 105 and thereby identifies the article in the field 106 (for example, the transport robot 101, goods not illustrated, an obstacle placed in the field 106, or the like). Note that the position information generation apparatus 103 may treat an article not present in an initial state of the field 106, as an "obstacle."

The position information generation apparatus 103 calculates the position (absolute position) of the object in the three-dimensional coordinate system (X axis, Y axis, and Z axis) having any one point (for example, an entrance) in the field 106 as the origin. The position information generation apparatus 103 transmits position information of the article (referred to as article position information below) obtained through the calculation to the control apparatus 102. Alternatively, the position information generation apparatus 103 may calculate the position of the object in the two-dimensional coordinate system (X axis and Y axis) having any one point in the field 106 as the origin.

The transport planning apparatus 104 generates goods transport plan information including information related to a transport source and a transport destination of goods to be transported by the transport robot 101. Specifically, the transport planning apparatus 104 provides an operation screen (graphical user interface (GUI)) through which the transport source and the transport destination of the goods to be transported specified by an operator are input. The transport planning apparatus 104 generates the goods transport plan information, based on the information input through the GUI. The transport planning apparatus 104 transmits the generated goods transport plan information to the control apparatus 102.

The control apparatus 102 uses the article position information acquired from the position information generation apparatus 103 and the goods transport plan information acquired from the transport planning apparatus 104, to control the transport robot 101. When the control apparatus 102 acquires the transport plan information, the control apparatus 102 selects the transport robot 101 standing by in the field 106 and instructs the selected transport robot 101 to head for the transport source included in the transport plan information. Specifically, the control apparatus 102 transmits a control command (control information) to the selected transport robot 101 to remotely control the transport robot 101 to head for the transport source.

The transport robot 101 moves to the transport source, based on the control command from the control apparatus 102, and, when preparation for transport of the goods is completed, transmits a "completion notification" to the control apparatus 102. Note that such a completion notification need not be transmitted from the transport robot 101 in some control methods of the control apparatus 102. For example, the control apparatus 102 may determine that transport preparation by the transport robot 101 is competed, a predetermined time period (for example, 30 seconds) after move of the transport robot 101 to a predetermined position.

When the control apparatus 102 acquires the completion notification of the transport preparation from the transport robot 101, the control apparatus 102 transmits a control command to the transport robot 101 to remotely control the transport robot 101 to move to the transport destination included in the goods transport plan information.

Next, a functional configuration of each of the apparatuses included in the transport system 100 will be described.

Figure 4:
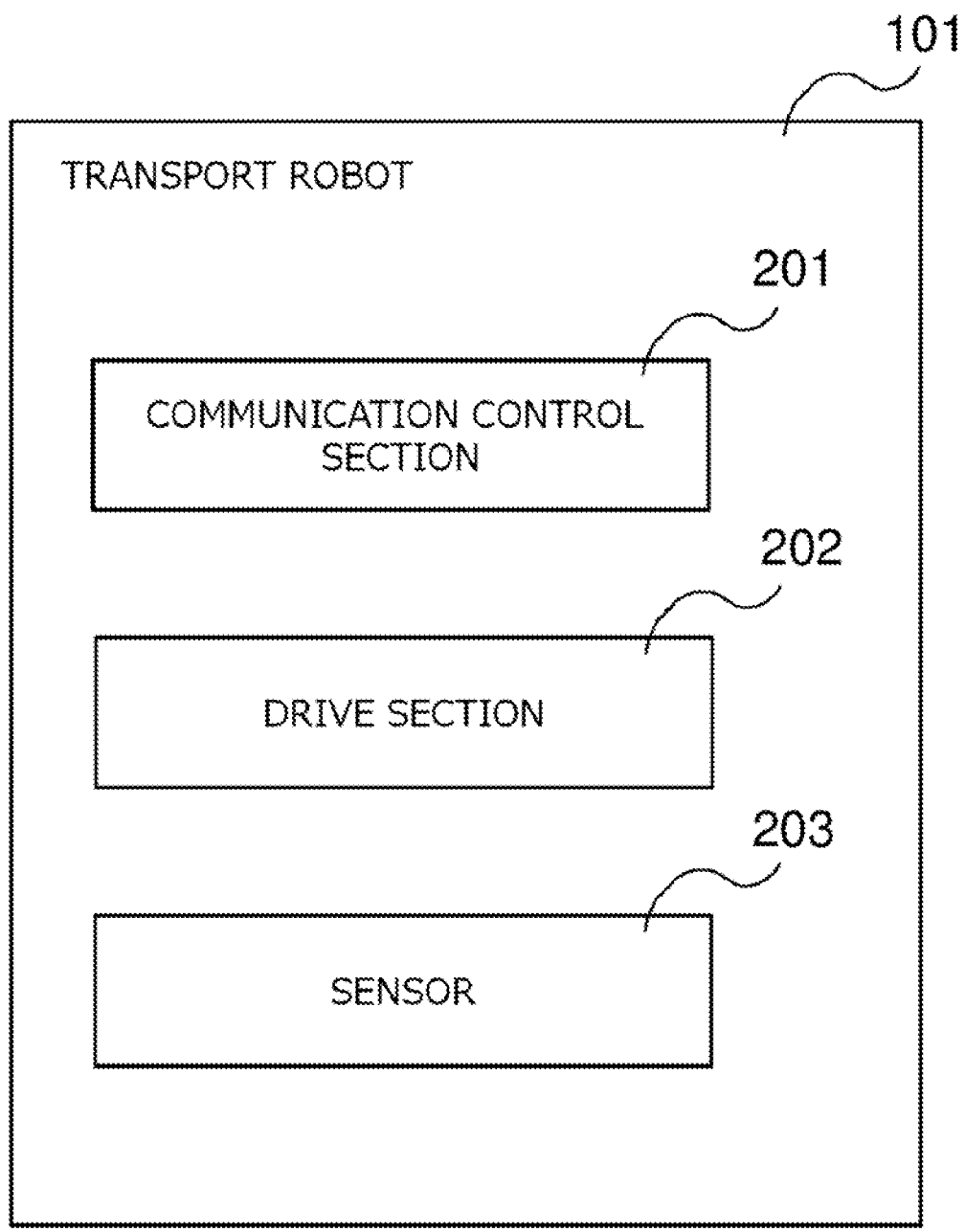
FIG. 4 is a diagram illustrating an example of a functional configuration of a transport robot according to the first example embodiment.

FIG. 4 is a diagram illustrating an example of a functional configuration (processing modules) of the transport robot according to the first example embodiment. The transport robot 101 includes a communication control section 201, a drive section 202, and a sensor 203.

The communication control section 201 is a means to control communication with the control apparatus 102. The communication control section 201 communicates with the control apparatus 102 by using a radio communication means, for example, a wireless local area network (LAN), long term evolution (LTE), or a network used in a specific area such as local 5G, or the like.

The drive section 202 is a means to drive two wheels of the transport robot 101, based on the control command (control information) received from the control apparatus 102. For example, the control apparatus 102 transmits a control command including rotation start of a motor, the rotation speed of the motor, rotation stop of the motor, or the like, to the transport robot 101. The drive section 202 controls the motor or the like in accordance with the control command to drive the two wheels of the transport robot 101.

The sensor 203 detects the orientation of the transport robot 101. The transport robot 101 transmits information related to the detected orientation of the transport robot 101 to the control apparatus 102 via the communication control section 201. For example, the sensor 203 may be a gyro sensor.

Figure 5:
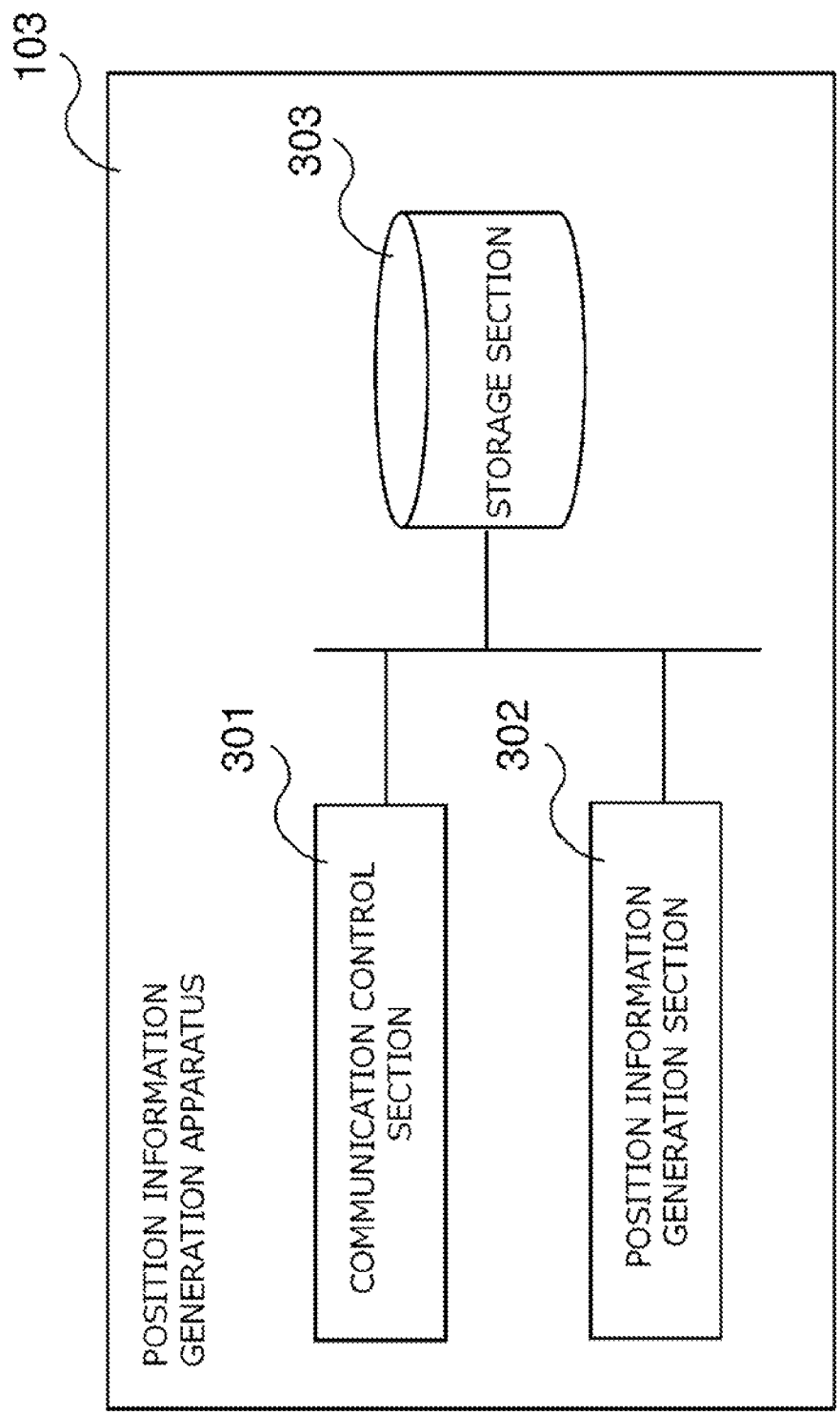
FIG. 5 is a diagram illustrating an example of a functional configuration of a position information generation apparatus according to the first example embodiment.

FIG. 5 is a diagram illustrating an example of a functional configuration (processing modules) of the position information generation apparatus according to the first example embodiment. The position information generation apparatus 103 includes a communication control section 301, a position information generation section 302, and a storage section 303.

The communication control section 301 is a means to control communication with other apparatuses (for example, the camera apparatus 105 and the control apparatus 102) connected with wires (for example, a LAN, an optical fiber, or the like) or wirelessly.

The position information generation section 302 is a means to generate article position information described above. The position information generation section 302 generates article position information, based on image data acquired from the camera apparatus 105.

The camera apparatus 105 transmits the image data together with the identifier (ID) of the camera apparatus 105 itself to the position information generation apparatus 103. The position information generation apparatus 103 identifies the camera apparatus 105 being the transmission source of the image data, based on the identifier. The camera apparatus 105 is fixed to a ceiling or the like and continuously transmits image data of the field 106 to the position information generation apparatus 103.

The position information generation section 302 detects an article in the following method, for example. The storage section 303 stores information associating the identifier of the camera apparatus 105 and an area for the camera apparatus 105 to capture an image. The position information generation section 302 refers to the association information to thereby be able to grasp the area in the field 106 to which the acquired image data corresponds.

The storage section 303 stores initial image data of the area for the camera apparatus 105 to capture an image. The initial image data is image data including no article absent in the field 106 in the initial state. The position information generation section 302 compares the acquired image data and the initial image data corresponding to the acquired image data, and determines, if there is any difference, that any of articles to be detected is included in the image data. Note that the articles to be detected by the position information generation section 302 include the transport robot 101, goods to be transported, an obstacle placed in a passage in the field 106, and the like.

Note that determination about articles by the position information generation section 302 is not limited to the method using the initial image data. For example, the position information generation section 302 may calculate coordinates of an article (obstacle), and detect that an article is present in the passage (on the link), based on the coordinates of the article and normal coordinate information of the field.

In a case of detecting an article, the position information generation section 302 approximates the article to have a rectangular shape, for example, and calculates the coordinates of the four points of the rectangular shape. Specifically, the position information generation section 302 calculates relative coordinates (X coordinate and Y coordinate) of the article with respect to the absolute coordinates of a reference point of the image data (for example, lower left of the image), based on the number of pixels from the reference point to the article. In this event, the position information generation section 302 calculates the relative coordinates of the object, based on information (the resolution of an image sensor and the like) of the camera apparatus 105 by which the image data is acquired.

The absolute coordinates of the reference point of the acquired image data are known in advance. The position information generation section 302 adds the calculated relative coordinates of the article to the absolute coordinates of the reference point, to thereby calculate the absolute coordinates (XY coordinates) of the article in the field. Further, when an image data is already obtained by the depth camera through capturing, the position information generation section 302 reads the pixel value corresponding to the calculated X coordinate and Y coordinate, to thereby use the pixel value as the Z coordinate (height) of the article.

The position information generation section 302 performs such processing for each of four corners of the article, to thereby calculate the absolute positions of the four points forming the article.

The position information generation section 302 determines the kind of article included in the acquired image. The position information generation section 302 calculates the size of the detected article from the absolute coordinates of the four points. The position information generation section 302 may determine the kind of article, based on the calculated size. For example, since the size of the transport robot 101 is known in advance, the position information generation section 302 determines, when the size of the article and the size of the transport robot 101 match, that the detected article is the transport robot 101. In contrast, when the size of the detected article and the size of the transport robot 101 do not match, the position information generation section 302 determines that the detected article is an obstacle.

Note that the method of determining whether an article is a transport robot, based on the size of the article, is an example, and any other methods can be used. For example, the transport robot 101 may be detected by attaching a marker having an identification function, such as a QR code (registered trademark) or an augmented reality (AR) marker, to the transport robot 101, and the position information generation section 302 reading the marker. In the first example embodiment, a description will be given by assuming that the marker is attached to the transport robot 101, a detected article is the transport robot 101, and identification of the transport robot 101 is possible. Alternatively, the position information generation section 302 may transmit a particular signal or message to the transport robot 101, and the transport robot 101 having received the signal or the like may respond with an identification number or the like, to thereby identify the transport robot 101. In other words, even though identification information (for example, a character or pattern) is not provided on the outside of the transport robot 101, the position information generation section 302 can identify the transport robot 101, based on the signal or the like from the transport robot 101.

The position information generation section 302 transmits the kind of detected article (the transport robot 101, an obstacle, or the like) and the absolute position of the article to the control apparatus 102. Note that the absolute position of the article may be the calculated absolute coordinates of the four points forming the article or may be the absolute coordinates of one point (for example, the center of the article) representing the article.

Figure 6:
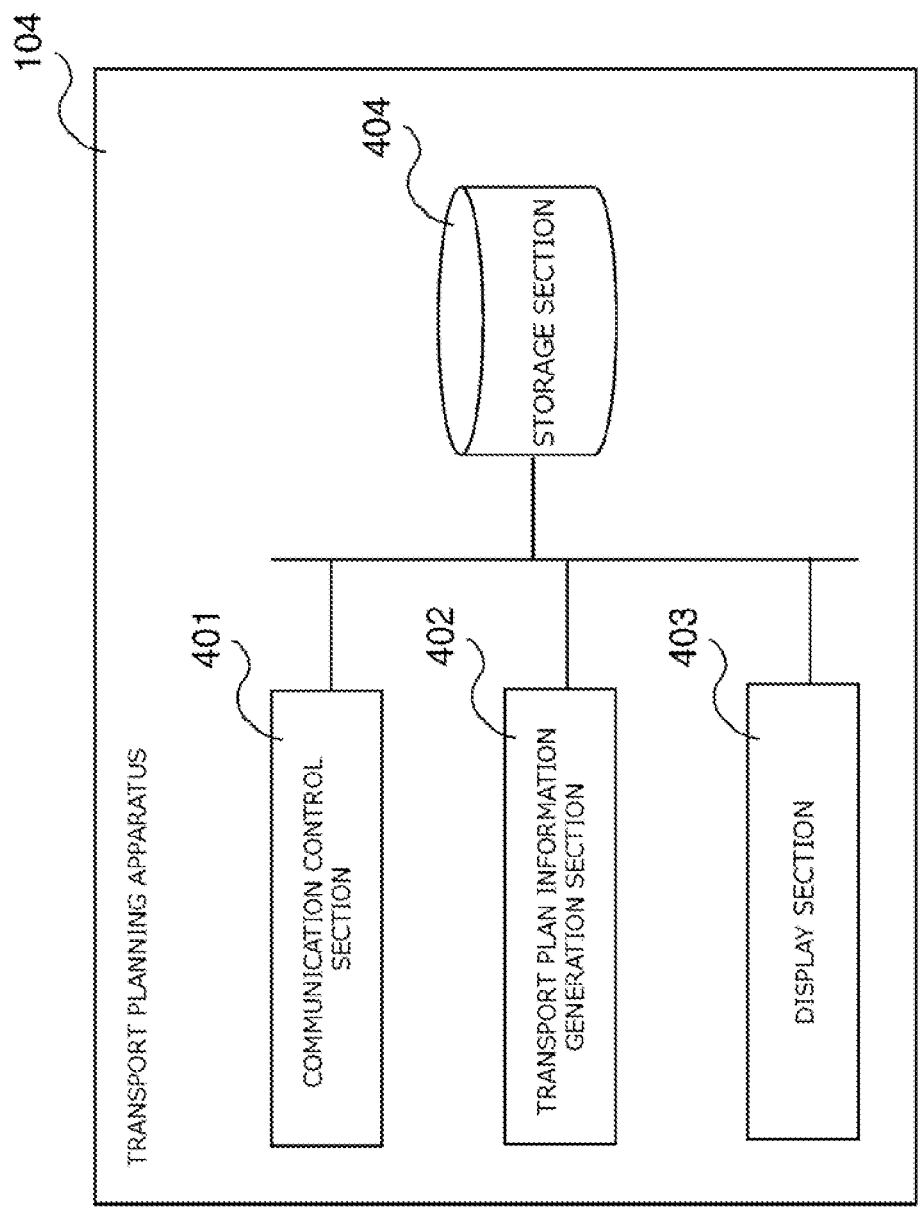
FIG. 6 is a diagram illustrating an example of a functional configuration of a transport planning apparatus according to the first example embodiment.

FIG. 6 is a diagram illustrating an example of a functional configuration (processing modules) of the transport planning apparatus according to the first example embodiment. The transport planning apparatus 104 includes a communication control section 401, a transport plan information generation section 402, a display section 403, and a storage section 404.

The communication control section 401, similarly to the communication control section 301 of the position information generation apparatus 103, is a means to control communication with other apparatuses.

The transport plan information generation section 402 is a means to generate goods transport plan information described above. The transport plan information generation section 402 generates information related to a GUI through which the transport source and the transport destination of the goods to be transported specified by an operator are input. The transport plan information generation section 402 passes GUI information thus generated to the display section 403. The display section 403 displays the GUI information on the display section 403. The display section 403 may be, for example, a liquid crystal display or the like. Alternatively, the transport plan information generation section 402 may generate information for displaying the GUI on a terminal (not illustrated) used by the operator and transmit generated information to the terminal.

The transport plan information generation section 402 displays a screen as that illustrated in FIG. 7, for example. The transport plan information generation section 402 transmits information input by the operator, to the control apparatus 102. Specifically, the transport plan information generation section 402 associates information specifying goods to be transported (for example, the name of the goods, a serial number, or the like), the place where the goods are placed (transport source), and the transport destination of the goods with each other, and transmits the associated information, as the goods transport plan information, to the control apparatus 102.

Note that, in a case where the transport destination and the like are exchanged using a name or the like in the field, between the transport planning apparatus 104 and the control apparatus 102, the absolute coordinates for each name in the field are shared between the transport planning apparatus 104 and the control apparatus 102 in advance. Alternatively, the transport plan information generation section 402 may convert a name in the field input by the operator into the absolute coordinates in the field and transmit the absolute coordinates obtained through the conversion to the control apparatus 102.

Figure 8:
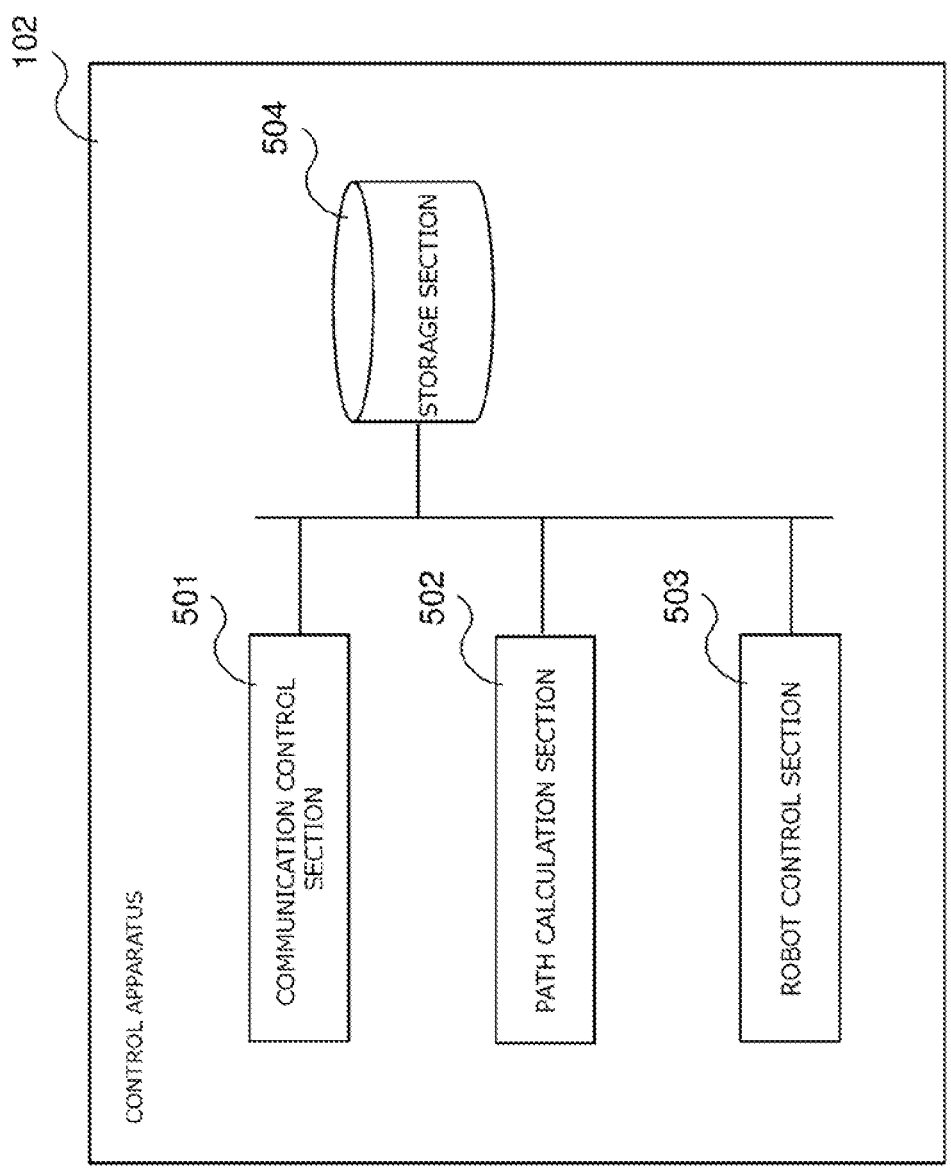
FIG. 8 is a diagram illustrating an example of a functional configuration of a control apparatus according to the first example embodiment.

FIG. 8 is a diagram illustrating an example of a functional configuration (processing modules) of the control apparatus according to the first example embodiment. The control apparatus 102 includes a communication control section 501, a path calculation section 502, a robot control section 503, and a storage section 504.

The communication control section 501, similarly to the communication control section 401 of the transport planning apparatus 104 and the like, controls communication with other apparatuses. The communication control section 501 stores the goods position information acquired from the position information generation apparatus 103 and goods transport plan information acquired from the transport planning apparatus 104, in the storage section 504.

The path calculation section 502 is a means to calculate a target path (also referred to simply as a path or a transport path below) for the transport robot 101 to transport the goods from the transport source to the transport destination, based on the goods transport plan information generated by the transport planning apparatus 104. The path calculation section 502 uses, for example, a path search algorithm, such as Dijkstra's algorithm or Bellman-Ford algorithm, to calculate the path for transporting the goods from the transport source to the transport destination. The path calculation section 502 stores, in the storage section 504, the calculated path and the transport robot 101 to use the path in association with each other.

The robot control section 503 is a means to control the transport robot 101. The robot control section 503 transmits control information for transporting the goods by the transport robot 101, to the transport robot 101, based on the position information of the transport robot 101. Specifically, the robot control section 503 transmits a control command (control information) to the transport robot 101 to control the transport robot 101. Note that the robot control section 503 may transmit all control commands at once to allow the transport robot 101 to move from the transport source to the transport destination, or may sequentially transmit the control commands according to the position and the like of the transport robot 101.

The robot control section 503 generates a control command so that the transport robot 101 moves in the path calculated as the transport path of the transport robot 101 and transmits the control command to the transport robot 101.

When the transport robot 101 is to move straight ahead, the robot control section 503 calculates the time and speed for the motor of the transport robot 101 to rotate, based on the distance between the current position of the transport robot 101 and a calculated arrival position.

To turn the transport robot 101, the robot control section 503 uses a model of a circular movement to draw a curve by the velocity difference between the right and left wheels. Specifically, the robot control section 503 calculates input velocities of the right and left wheels to reach a target position from the current position in a circular orbit, based on the target position and the position and orientation of the transport robot 101. The robot control section 503 generates a control command to transmit to the transport robot 101, based on the calculated input velocities.

Note that the control apparatus 102 is implementable as a cloud server in a network (for example, a radio communication network such as the Internet or LTE).

2.2. Operation Example

As described above, the control apparatus 102 controls the transport robot 101 so that the transport robot 101 travels while following a path. In the following, however, by taking a case in which the transport robot 101 deviates from the path to avoid an obstacle in the path as an example, an operation example of returning the transport robot 101 to the path will be described.

Figure 9:
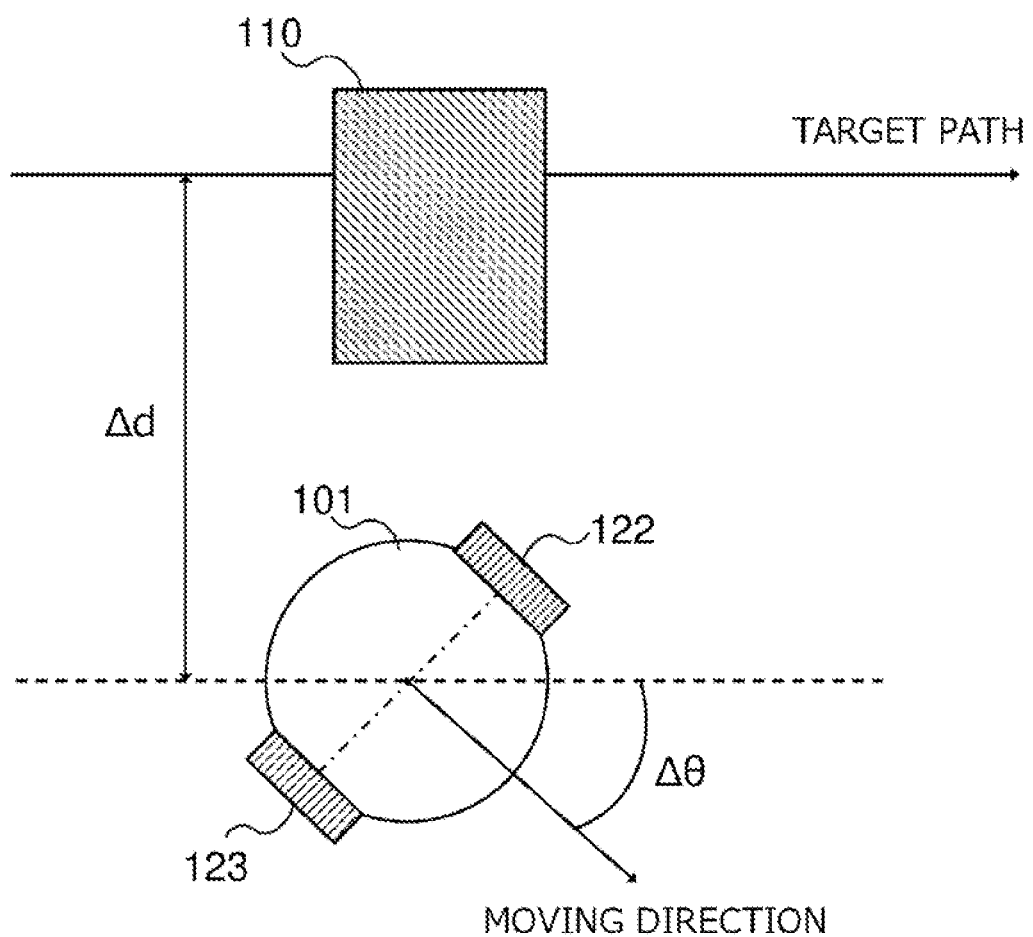
FIG. 9 is a diagram illustrating an example of the transport robot deviating from a target path.

FIG. 9 is a diagram illustrating an example of a transport robot deviating from a target path. FIG. 9 illustrates a view taken by looking from above at a field where the transport robot 101 and an obstacle 110 are present. The example of the operation of the control apparatus 102 to be described below may be performed after the transport robot 101 has passed the position of the obstacle 110. A distance Δd denotes the distance between the center position of the transport robot 101 and the target path. The angle between the moving direction of the transport robot 101 and the target path is denoted by AO. When the transport robot 101 has deviated from the target path as illustrated, the operation described below is performed. Note that, as illustrated in FIG. 9, the transport robot 101 includes a pair of driving wheels 122 and 123 arranged with the axles of the respective driving wheels 122 and 123 passing through the center of gravity of the transport robot 101.

Figure 10:
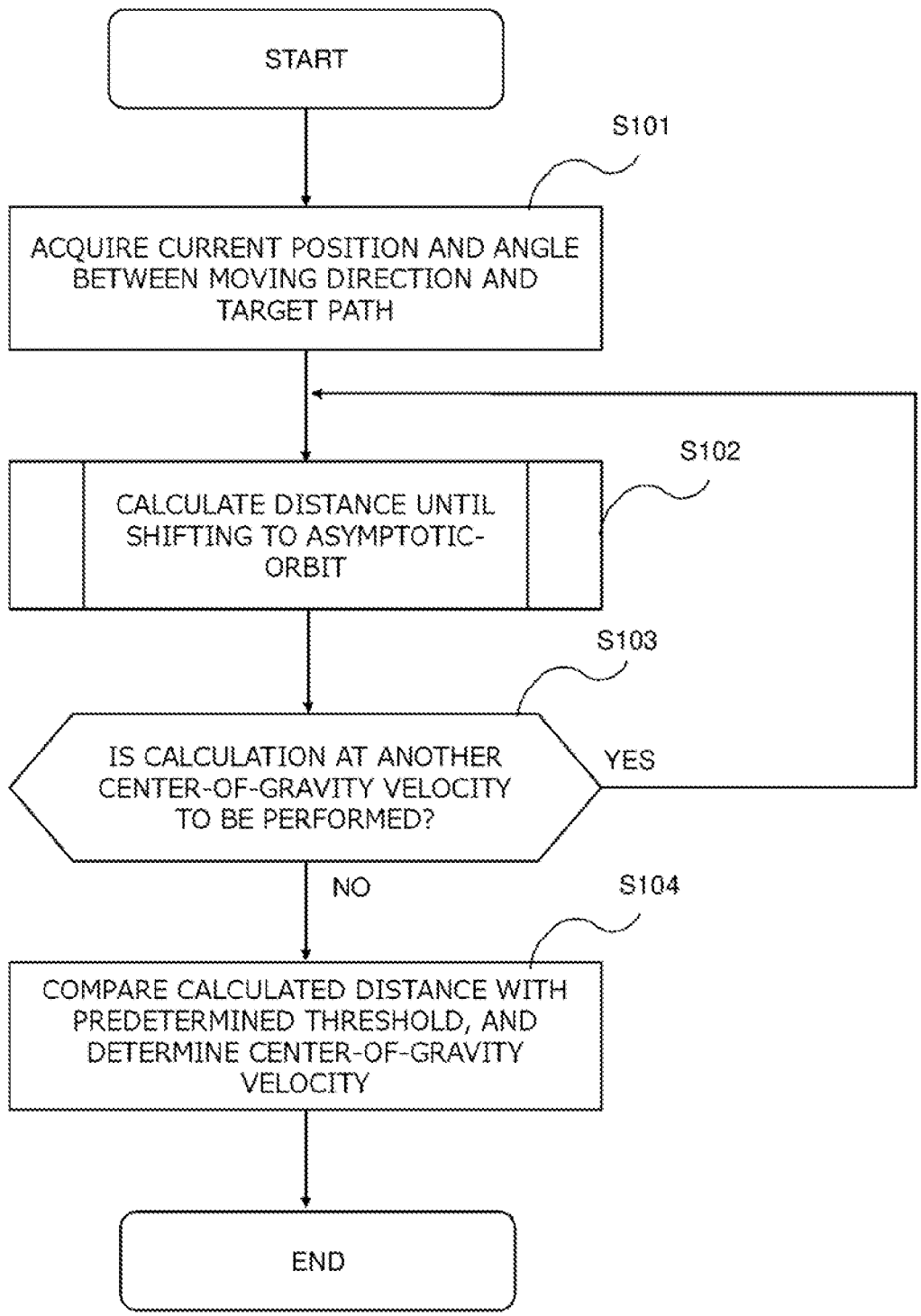
FIG. 10 is a flowchart illustrating an example of operation of the control apparatus according to the first example embodiment.
Figure 12:
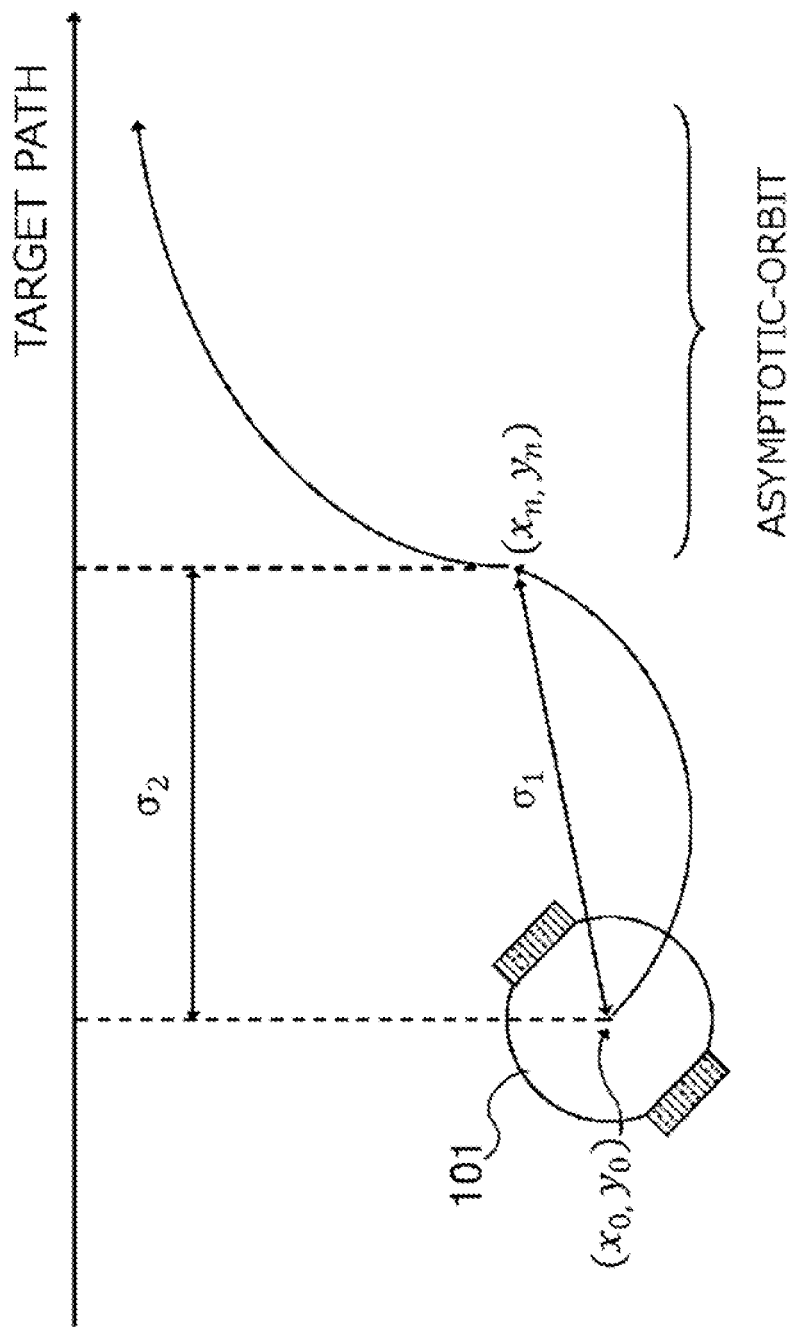
FIG. 12 is a diagram for describing an example of the operation of the control apparatus according to the first example embodiment.

FIG. 10 is a flowchart illustrating an example of the operation of the control apparatus according to the first example embodiment. The steps in the flowchart can be performed by the robot control section 503 of the control apparatus 102. The control apparatus 102 operates to return the transport robot 101 to the target path, for example, when the transport robot 101 has deviated from the target path, and the like. FIG. 12 is a diagram for describing the example of the operation of the control apparatus according to the first example embodiment. The example of the operation of the control apparatus 102 will be described below also with reference to FIG. 12.

First, in S101, the control apparatus 102 acquires the current position ($x_0$, $y_0$) of the transport robot 101 and the angle AO (refer to FIG. 9) between the moving direction of the transport robot 101 and the target path. The current position ($x_0$, $y_0$) is an initial position of the transport robot 101 when the transport robot 101 starts the operation.

Then, in S102, the control apparatus 102 calculates distance until shifting the transport robot 101 to an asymptotic-orbit for the target path. In other words, the control section 503 can function as a calculation means to calculate distance until shifting the transport robot 101 to the asymptotic-movement for the target path. As illustrated in FIG. 12, the transport robot 101 first turns to change the direction and thereafter shifts to the asymptotic-orbit for the target path. In the present example embodiment, the control apparatus 102 controls the distance until shifting the transport robot 101 to the asymptotic-orbit.

Figure 11:
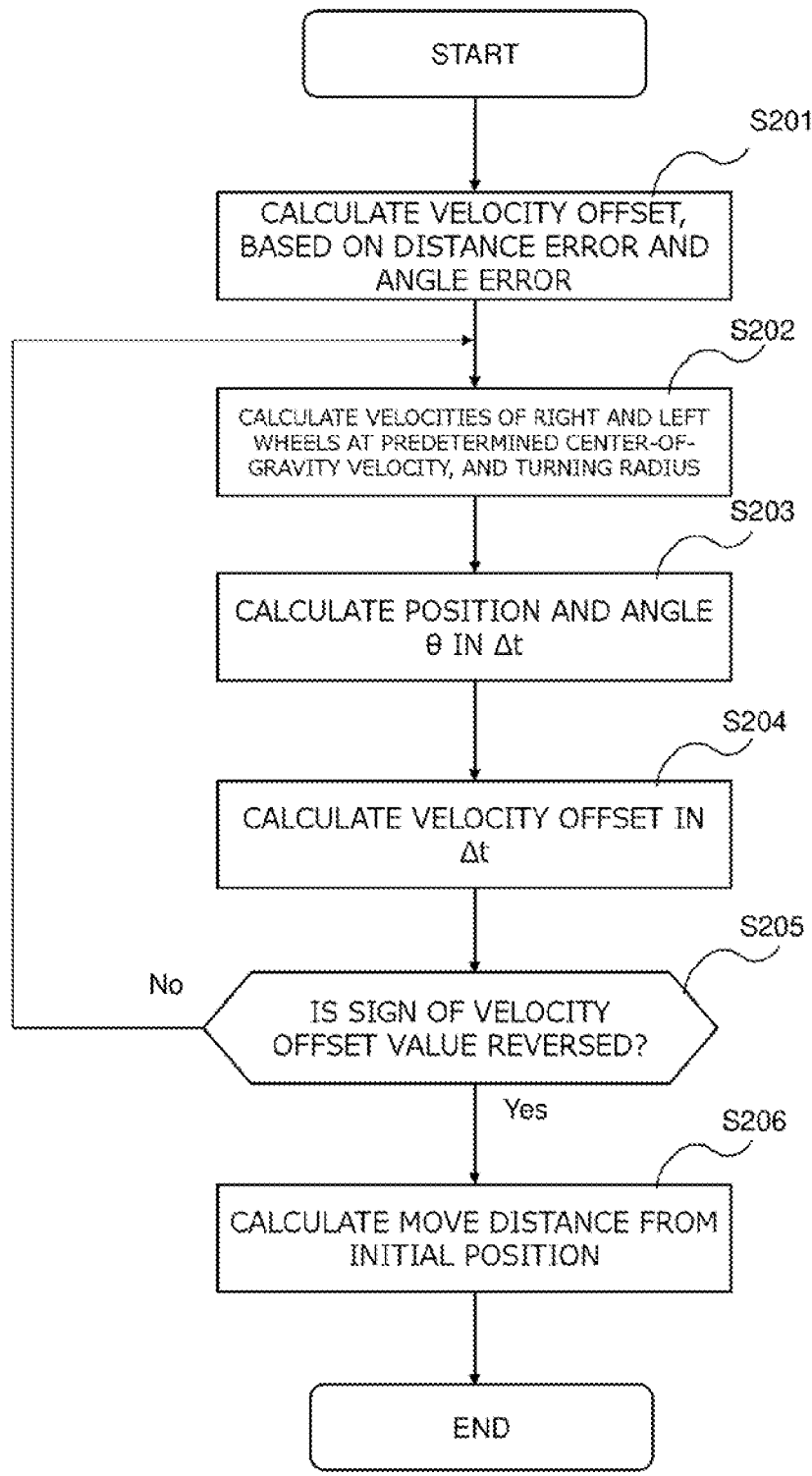
FIG. 11 is a flowchart illustrating an example of the operation of the control apparatus according to the first example embodiment.

Here, processing in S102 will be described in detail with reference to FIG. 11. The processing in S102 is processing for calculating distance to travel until shifting the transport robot 101 to the asymptotic-orbit, at one of one or more candidate center-of-gravity velocities. Note that the center-of-gravity velocity is the velocity of the center of gravity of the transport robot 101 driven by the right and left driving wheels. In the processing in S102, a different candidate center-of-gravity velocity may be selected for each time. For example, by selecting a candidate center-of-gravity velocity within a range where the transport robot 101 does not suddenly accelerate or decelerate, the transport robot 101 can gradually accelerate or decelerate.

First, in S201, the control apparatus 102 calculates a velocity offset $\Delta V_{offset}$ related to the velocity difference between the right and left wheels, based on a distance error Δd with respect to the target path calculated from the current position of the transport robot 101 and an angle error Δθ corresponding to the angle between the moving direction of the transport robot 101 and the target path. The velocity offset $\Delta V_{offset}$ can be calculated by using a gain coefficient k as expressed in equation (1) below.

[Math. 1]

$$\Delta V_{offset} = k_d \Delta d + k_{dD} \Delta \dot{d} + k_\theta \Delta \theta + k_{\theta D} \Delta \dot{\theta} \quad (1)$$

Thus, the velocity offset $\Delta V_{offset}$ is determined based on the distance error Δd and the angle error Δθ of the transport robot 101.

Then, in S202, the control apparatus 102 calculates the velocities of the right and left wheels and a turning radius at a predetermined center-of-gravity velocity (also referred to as a base velocity). The velocities $V_{r,l}$ of the right and left wheels of the transport robot 101 may be calculated by using the predetermined base velocity $V_{base}$ and the velocity offset $\Delta V_{offset}$ calculated in S201, as expressed in equation (2) below.

[Math. 2]

$$V_{r,l} = V_{base} \pm V_{offset} \quad (2)$$

The control apparatus 102 may use the velocities $V_{r,l}$ of the right and left wheels to calculate a turning radius R of the transport robot 101 as expressed in equation (3) below.

[Math. 3]

$$R = w \frac{V_r + V_l}{V_r - V_l} \quad (3)$$

Here, 2w is assumed to denote the distance between the right and left wheels.

Then, in S203, the control apparatus 102 calculates the position ($x_{t+\Delta t}$, $y_{t+\Delta t}$) of the transport robot 101 in a predetermined time cycle Δt and an angle $\theta_{t+\Delta t}$ as expressed in equations (4) to (8) below.

[Math. 4]

$$P_x = R \sin\left(\Delta t \frac{V_r - V_l}{2w}\right) \quad (4)$$

[Math. 5]

$$P_y = R\left(1 - \cos\left(\Delta t \frac{V_r - V_l}{2w}\right)\right) \quad (5)$$

[Math. 6]

$$x_{t+\Delta t} = x_t + p_x \cos\theta - p_y \sin\theta \quad (6)$$

[Math. 7]

$$y_{t+\Delta t} = y_t + p_x \sin\theta + p_y \cos\theta \quad (7)$$

[Math. 8]

$$\theta_{t+\Delta t} = \theta_t + \Delta t \frac{V_r - V_l}{2w} \quad (8)$$

Then, in S204, the control apparatus 102 calculates the velocity offset $\Delta V_{offset}$ in $\Delta t$, based on the distance error $\Delta d$ and the angle error $\Delta \theta$ in $\Delta t$ as illustrated in equation (1) above.

Then, in S205, the control apparatus 102 determines whether the sign (positive/negative) of the velocity offset value calculated in S204 is inverted. A state where the sign of the velocity offset value is inverted indicates a state where the magnitudes of the velocities of the right and left wheels has been reversed on the right and left sides. As illustrated in FIG. 12, as the transport robot 101 directed away from the target path turns to be directed to the target path, the velocity offset value gradually decreases and is then inverted in terms of sign. Here, it is assumed that the velocity offset value is inverted at the position $(x_n, y_n)$ of the transport robot 101 after the time cycle $\Delta t$ is repeated n steps. The state before the velocity offset value is inverted can be expressed as $|k_d \Delta_d| > |k_\theta \Delta \theta|$ by using the distance error $\Delta d$, the angle error $\Delta \theta$, and the gain coefficient k, and the state where the velocity offset value is inverted can be expressed as $|k_d \Delta_d| > |k_\theta \Delta \theta|$.

When the control apparatus 102 determines that the sign of the velocity offset value is not inverted, the control apparatus 102 returns to S202 and repeats the processing. When the sign of the velocity offset value is inverted, on the other hand, the control apparatus 102 advances to S206.

In S206, the control apparatus 102 calculates move distance of the transport robot 101 when the sign of the velocity offset value is inverted.

Then, with reference to FIG. 10 again, in S103, the control apparatus 102 determines whether to calculate distance until shifting to the asymptotic-orbit at another candidate center-of-gravity velocity. In a case of calculating the distance at another candidate center-of-gravity velocity, the control apparatus 102 returns to S102 and repeats the processing. In a case of not calculating the distance at another candidate center-of-gravity velocity, on the other hand, the control apparatus 102 advances to S104.

In S104, the control apparatus 102 compares the calculated move distance of the transport robot 101 with a predetermined threshold $\sigma$ and determines a candidate center-of-gravity velocity with the move distance being within the predetermined threshold $\sigma$, to be a target center-of-gravity velocity until shifting the transport robot 101 to the asymptotic-orbit by turning the transport robot 101. In other words, the control apparatus 102 determines the center-of-gravity velocity $V_{base}$ satisfying equation (9) below, to allow the transport robot 101 to move into the asymptotic-orbit within the predetermined threshold $\sigma$.

[Math. 9]

$$\sqrt{(x_n-x_0)^2+(y_n-y_0)^2} < \sigma \quad (9)$$

Thus, the robot control section 503 of the control apparatus 102 can function as a means to determine the target center-of-gravity velocity.

Note that, as illustrated in FIG. 12, the distance from the initial position $(x_0, y_0)$ to the position $(x_n, y_n)$ after n steps may be compared with a threshold $\sigma_1$ or may be compared with a threshold $\sigma_2$ for an x-direction move distance.

Note that the part (first part) until shifting to the asymptotic-orbit in the orbit of the transport robot 101 mainly aims to reduce the distance error between the target path and the transport robot 101. The asymptotic-orbit (second part), in contrast, mainly aims to match the target path and the moving direction of the transport robot 101.

As described above, in the present example embodiment, distance of move until shifting to the asymptotic-orbit is simulated at each of the one or more candidate center-of-gravity velocities, and is compared with the predetermined threshold, to determine a target center-of-gravity velocity. The control apparatus 102 controls the transport robot 101, based on the determined target center-of-gravity velocity, to thereby be able to control travel distance in returning to the target path. In other words, since the center-of-gravity velocity can be determined within a range where the travel distance does not exceed the threshold, it is possible not to travel long travel distance to return to the target path.

Figure 13:
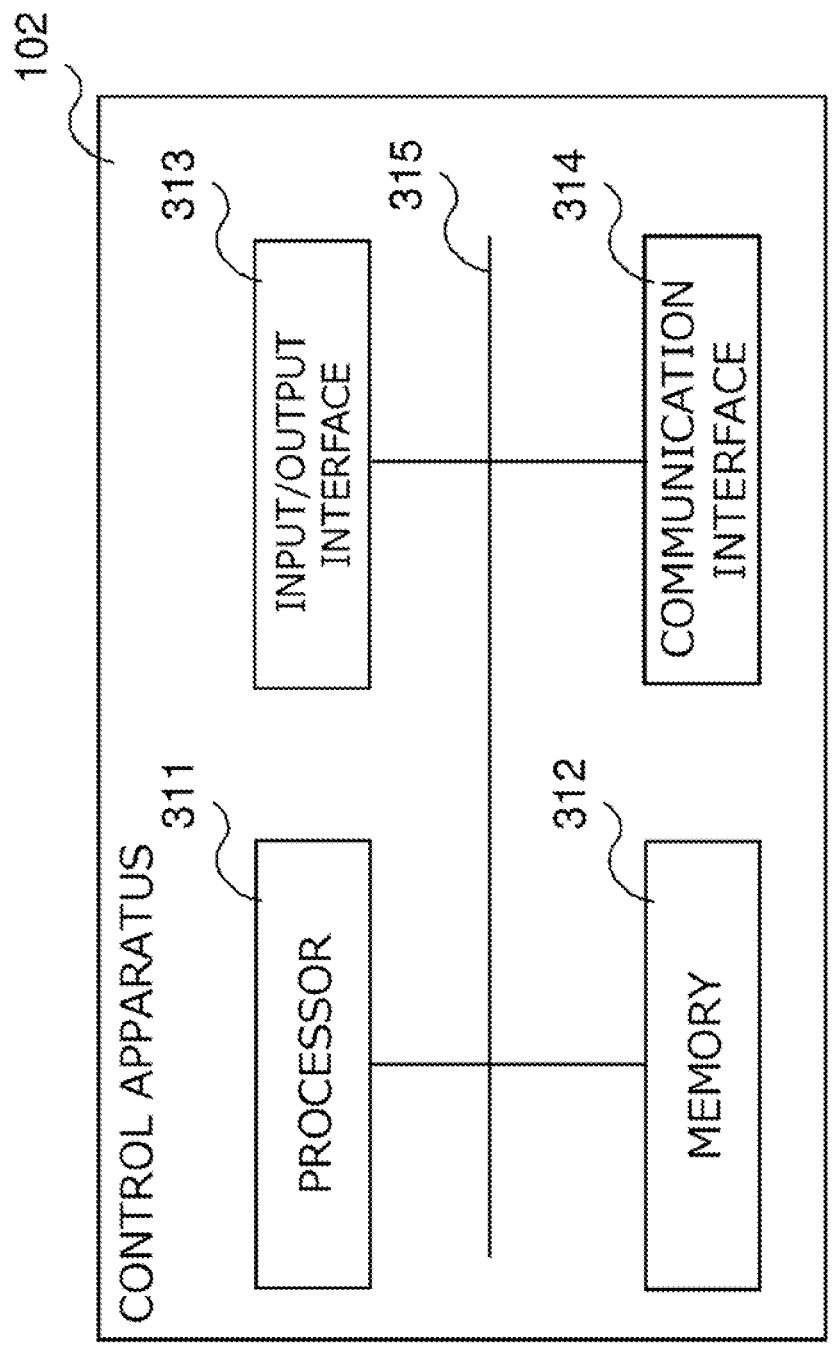
FIG. 13 is a diagram illustrating an example of a hardware configuration of the control apparatus according to the first example embodiment.

Next, hardware of each of apparatuses constituting the transport system will be described. FIG. 13 is a diagram illustrating an example of a hardware configuration of the control apparatus 102.

The control apparatus 102 can be configured with an information processing apparatus (so-called, a computer). For example, the control apparatus 102 includes a processor 311, a memory 312, an input/output interface 313, a communication interface 314, and the like. Constituent elements such as the processor 311 are connected to each other with an internal bus 315 or the like, and are configured to be capable of communicating with each other.

Note that the configuration illustrated in FIG. 13 is not to limit the hardware configuration of the control apparatus 102. The control apparatus 102 may include hardware not illustrated, or need not include the input/output interface 313 as necessary. The number of processors 311 or the like included in the control apparatus 102 is not to be limited to the example illustrated in FIG. 13, and for example, a plurality of processors 311 may be included in the control apparatus 102.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC), a radio communication circuit, or the like.

The function of the control apparatus 102 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that each of the position information generation apparatus 103, the transport planning apparatus 104, and the like can be configured with an information processing apparatus similarly to the control apparatus 102, and there is no difference in basic hardware configuration between the apparatus and the control apparatus 102. Hence, a description of the basic hardware configuration is omitted.

3. Second Example Embodiment

Next, a second example embodiment will be described in detail with reference to FIG. 14 and FIG. 15.

3.1. System Configuration

Figure 14:
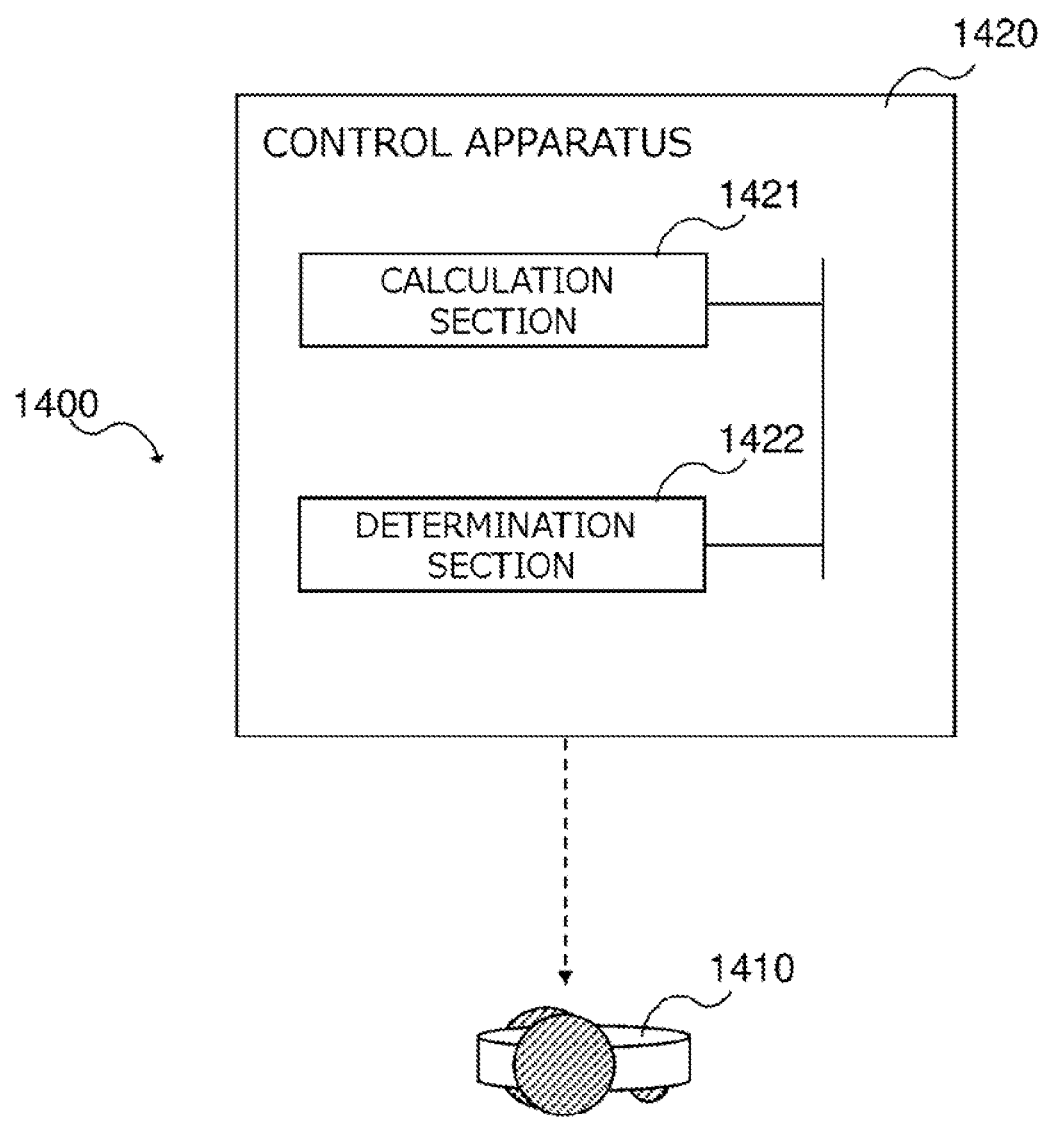
FIG. 14 is a diagram illustrating an example of a schematic configuration of a moving body control system according to a second example embodiment.

FIG. 14 is a diagram illustrating an example of a schematic configuration of a moving body control system according to the second example embodiment. A moving body control system 1400 according to the present example embodiment includes a moving body 1410 and a control apparatus 1420 configured to control the moving body 1410 to follow a target path. The control apparatus 1420 includes a calculation section 1421 and a determination section 1422.

The calculation section 1421 calculates distance until shifting the moving body 1410 to an asymptotic-orbit for the target path by turning the moving body 1410, at each of one or more candidate center-of-gravity velocities of the moving body 1410, based on a position of the moving body 1410 and an angle between a moving direction of the moving body 1410 and the target path. The determination section 1422 determines a target center-of-gravity velocity of the moving body 1410 from the one or more candidate center-of-gravity velocities, based on the distance calculated by the calculation section 1421.

Each of the processing sections of the apparatuses is implemented, for example, with a central processing unit (CPU) of a computer configured to operate in accordance with a program or a communication interface of the computer. For example, the CPU reads a program from a program recording medium, such as a program storage apparatus of the computer, and uses the communication interface as necessary to thereby be able to operate as each of the processing sections of each of the apparatuses described above in accordance with the program.

3.2. Operation Example

Figure 15:
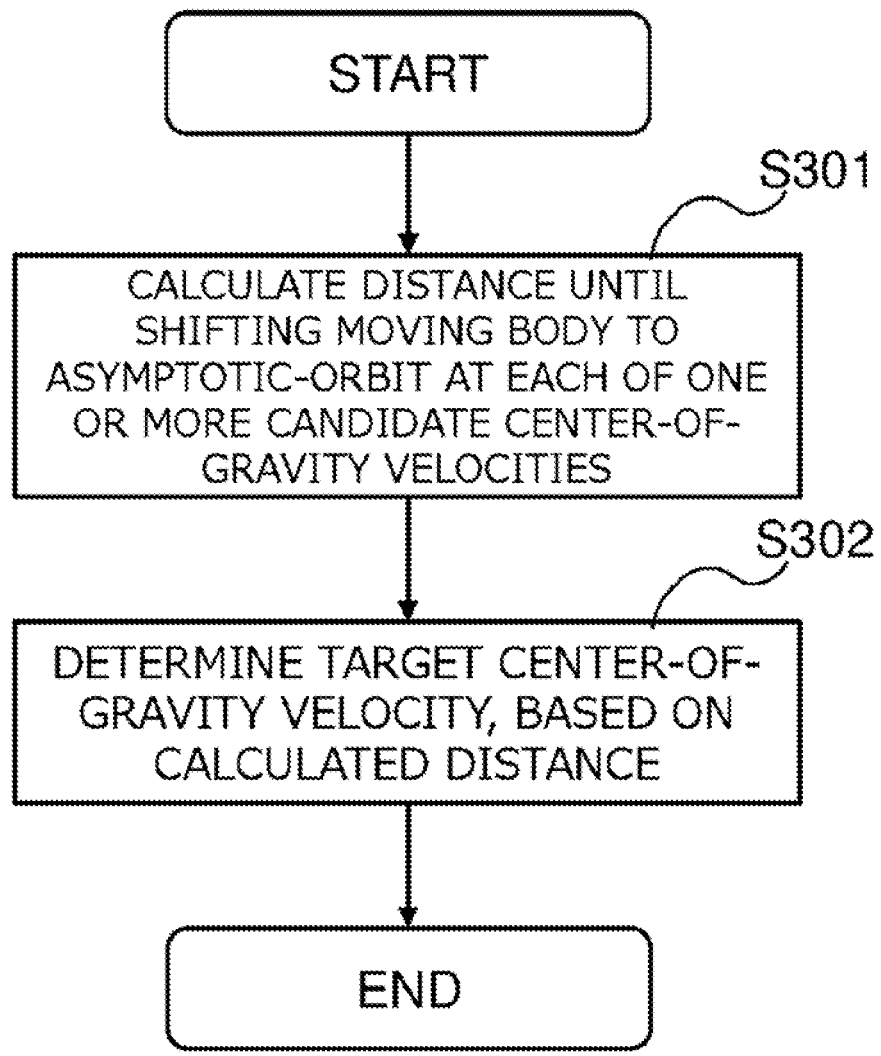
FIG. 15 is a flowchart illustrating an example of operation of a control apparatus according to the second example embodiment.

FIG. 15 is a flowchart illustrating an example of operation of the control apparatus according to the second example embodiment.

First, in S301, the control apparatus 1420 (calculation section 1421) calculates distance until shifting the moving body 1410 to an asymptotic-orbit for the target path by turning the moving body 1410, at each of one or more candidate center-of-gravity velocities of the moving body 1410, based on a position of the moving body 1410 and an angle between a moving direction of the moving body 1410 and the target path. Then, in S302, the control apparatus 1420 (determination section 1422) determines a target center-of-gravity velocity of the moving body 1410 from the one or more candidate center-of-gravity velocities, based on the calculated distance.

Relationship with First Example Embodiment

As an example, the moving body control system 1400 according to the second example embodiment is a transport system 100 according to the first example embodiment. In this case, the description of the first example embodiment is also applicable to the second example embodiment.

Note that the second example embodiment is not limited to this example.

Note that the configuration, the operation, and the like of the transport system described in each of the example embodiments are merely examples, and are not to limit the configuration and the like of the system. For example, the functions of the position information generation apparatus 103 may be implemented by the control apparatus 102. For example, the position information generation apparatus 103 may perform processing related to determination of a position of an article, and the control apparatus 102 may determine the kind of the article.

Alternatively, the position information generation apparatus 103 may be installed in the field, and the control apparatus 102 may be implemented in a server in a network. In other words, the transport system according to the disclosure of this application may be implemented as an edge cloud system.

In the example embodiments, a description has been given of a case of using a camera (for example, a depth camera) capable of detecting the height of an article. However, a normal camera may be used when the height of an article need not be detected. Alternatively, an infrared sensor or a distance sensor may be used as a sensor for detecting a position of an article.

The example embodiments are also applicable to a case where an angular velocity ω expressed in equation (10) below and a steering angle s expressed in equation (11) below are input to the transport robot 101 for control. Note that, for a type of transport robot to which a steering angle is input, a plurality of wheels are arranged in a front-rear direction of the transport robot, the transport robot is changed in direction according to the steering angle of the one or plurality of wheels, to thereby be able to turn.

[Math. 10]

$$\omega = \frac{V_r - V_l}{2w} \qquad (10)$$

In the above equation, 2w denotes the distance between the right and left wheels.

[Math. 11]

$$s = \sin^{-1}\left(\frac{W\omega}{V_{base}}\right) \qquad (11)$$

In the above equation, W denotes a wheelbase being the distance between the front and rear wheels.

In the flowcharts used in the description above, a plurality of processes (processing) are described in order; however, the order of execution of the processes executed in each of the example embodiments is not limited to the described order. In each example embodiment, the illustrated order of processes can be changed as far as there is no problem with regard to processing contents, such as a change in which respective processes are executed in parallel, for example.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

Part of or all the example embodiments may be described as in the supplementary notes below but is not limited thereto.

Supplementary Note 1

A moving body control system including:
a moving body; and
a control apparatus configured to control the moving body to follow a target path; wherein,
the control apparatus is configured to:
calculate distance until shifting the moving body to an asymptotic-orbit for the target path by turning the moving body, at each of one or more candidate center-of-gravity velocities of the moving body, based on a position of the moving body and an angle between a moving direction of the moving body and the target path; and
determine a target center-of-gravity velocity of the moving body from the one or more candidate center-of-gravity velocities based on the calculated distance.

(Supplementary Note 2)

The moving body control system according to supplementary note 1, wherein the control apparatus is configured to determine, as the target center-of-gravity velocity, a candidate center-of-gravity velocity with the calculated distance being within a predetermined threshold among the one or more candidate center-of-gravity velocities.

(Supplementary Note 3)

The moving body control system according to supplementary note 1 or 2, wherein the moving body includes a pair of driving wheels arranged with axles of the respective driving wheels passing through center of gravity of the moving body, and is configured to be shifted to the asymptotic-orbit when an offset value indicating a velocity difference between the driving wheels is inverted in terms of positive/negative.

(Supplementary Note 4)

The moving body control system according to supplementary note 3, wherein the offset value is calculated based on distance between the moving body and the target path, and the angle.

(Supplementary Note 5)

The moving body control system according to supplementary note 3 or 4, wherein the velocity of each of two driving wheels constituting the pair of driving wheels is calculated based on a center-of-gravity velocity of the moving body and the offset value.

(Supplementary Note 6)

The moving body control system according to any one of supplementary notes 1 to 5, wherein the control apparatus is configured to repeatedly calculate the position and the angle of the moving body in a predetermined time cycle to calculate distance until shifting to the asymptotic-orbit.

(Supplementary Note 7)

The moving body control system according to any one of supplementary notes 1 to 6, wherein the moving body is a transport robot configured to transport goods.

(Supplementary Note 8)

A control apparatus including:
a calculation means configured to calculate distance until shifting a moving body controlled to follow a target path, to an asymptotic-orbit for the target path by turning the moving body, at each of one or more candidate center-of-gravity velocities of the moving body, based on a position of the moving body and an angle between a moving direction of the moving body and the target path; and
a determination means configured to determine a target center-of-gravity velocity of the moving body from the one or more candidate center-of-gravity velocities based on the calculated distance.

(Supplementary Note 9)

The control apparatus according to supplementary note 8, wherein the determination means is configured to determine, as the target center-of-gravity velocity of the moving body, a candidate center-of-gravity velocity with the calculated distance being within a predetermined threshold among the one or more candidate center-of-gravity velocities.

(Supplementary Note 10)

The control apparatus according to supplementary note 8 or 9, wherein the moving body includes a pair of driving wheels arranged with axles of the respective driving wheels passing through center of gravity of the moving body, and is configured to be shifted to the asymptotic-orbit when an offset value indicating a velocity difference between the driving wheels is inverted in terms of positive/negative.

(Supplementary Note 11)

The control apparatus according to supplementary note 10, wherein the offset value is calculated based on distance between the moving body and the target path, and the angle.

(Supplementary Note 12)

The control apparatus according to supplementary note 10 or 11, wherein the velocity of each of two driving wheels constituting the pair of driving wheels is calculated based on a center-of-gravity velocity of the moving body and the offset value.

(Supplementary Note 13)

The control apparatus according to any one of supplementary notes 8 to 12, wherein the calculation means is configured to repeatedly calculate the position and the angle of the moving body in a predetermined time cycle to calculate distance until shifting to the asymptotic-orbit.

(Supplementary Note 14)

The control apparatus according to any one of supplementary notes 8 to 13, wherein the moving body is a transport robot configured to transport goods.

(Supplementary Note 15)

A moving body control method including:
a calculation step of calculating distance until shifting a moving body controlled to follow a target path, to an asymptotic-orbit for the target path by turning the moving body, at each of one or more candidate center-of-gravity velocities of the moving body, based on a position of the moving body and an angle between a moving direction of the moving body and the target path; and
a determination step of determining a target center-of-gravity velocity of the moving body from the one or more candidate center-of-gravity velocities based on the calculated distance.

(Supplementary Note 16)

The moving body control method according to supplementary note 15, wherein the determination step includes determining, as the target center-of-gravity velocity of the moving body, a candidate center-of-gravity velocity with the calculated distance being within a predetermined threshold among the one or more candidate center-of-gravity velocities.

(Supplementary Note 17)

The moving body control method according to supplementary note 15 or 16, wherein the moving body includes a pair of driving wheels arranged with axles of the respective driving wheels passing through center of gravity of the moving body, and is configured to be shifted to the asymptotic-orbit when an offset value indicating a velocity difference between the driving wheels is inverted in terms of positive/negative.

(Supplementary Note 18)

The moving body control method according to supplementary note 17, wherein the offset value is calculated based on distance between the moving body and the target path, and the angle.

(Supplementary Note 19)

The moving body control method according to supplementary note 17 or 18, wherein the velocity of each of two driving wheels constituting the pair of driving wheels is calculated based on a center-of-gravity velocity of the moving body and the offset value.

(Supplementary Note 20)

The moving body control method according to any one of supplementary notes 15 to 19, wherein, in the calculation step, the position and the angle of the moving body are repeatedly calculated in a predetermined time cycle to calculate distance until shifting to the asymptotic-orbit.

(Supplementary Note 21)

The moving body control method according to any one of supplementary notes 15 to 20, wherein the moving body is a transport robot configured to transport goods.

INDUSTRIAL APPLICABILITY

Although the industrial applicability of the present invention is apparent from the description above, the present invention can be preferably applied to goods transport in a factory, distribution warehouse, or the like.

REFERENCE SIGNS LIST

100 Transport System
101 Transport Robot
102 Control Apparatus
103 Position Information Generation Apparatus
122, 123 Driving Wheel
124 Non-driving Wheel
201 Communication Control Section
202 Drive Section
203 Sensor
301 Communication Control Section
302 Position Information Generation Section
303 Storage Section
501 Communication Control Section
502 Path Calculation Section
503 Robot Control Section
504 Storage Section
1400 Moving Body Control System
1410 Moving Body
1420 Control Apparatus
1421 Calculation Section
1422 Determination Section

What is claimed is:

1. A moving body control system comprising: a moving body; a control apparatus controlling the moving body to follow a target path, wherein the control apparatus includes a memory storing instructions, and one or more processors, the one or more processors are configured to execute the instructions, and the moving body deviates from the target path to avoid an obstacle and returns to the target path by the one or more processors: calculating a distance until shifting of the moving body to an asymptotic-orbit returns the moving body to the target path by turning the moving body, at each of one or more candidate center-of-gravity velocities of the moving body, based on a position of the moving body and an angle between a moving direction of the moving body and the target path; determining a target center-of-gravity velocity of the moving body from the one or more candidate center-of-gravity velocities based on the calculated distance and the angle; controlling the moving body to return to the target path.

2. The moving body control system according to claim 1, wherein the one or more processors determine, as the target center-of-gravity velocity, a candidate center-of-gravity velocity for which the calculated distance is within a predetermined threshold among the one or more candidate center-of-gravity velocities.

3. The moving body control system according to claim 1, wherein the moving body includes a pair of driving wheels arranged with axles of the respective driving wheels passing through the center of gravity of the moving body, and the one or more processors shift the moving body to the asymptotic-orbit when an offset value indicating a velocity difference between the driving wheels is inverted in terms of positive/negative.

4. The moving body control system according to claim 3, wherein the offset value is calculated based on a distance between the moving body and the target path, and the angle.

5. The moving body control system according to claim 3, wherein the velocity of each of two driving wheels constituting the pair of driving wheels is calculated based on a center-of-gravity velocity of the moving body and the offset value.

6. The moving body control system according to claim 1, wherein the one or more processors repeatedly calculate the position and the angle of the moving body in a predetermined time cycle to calculate the distance until shifting of the moving body returns the moving body to the asymptotic-orbit.

7. The moving body control system according to claim 1, wherein the moving body is a transport robot configured to transport goods.

8. A control apparatus comprising: a memory storing instructions; and one or more processors configured to execute the instructions, wherein the moving body deviates from a target path to avoid an obstacle and returns to a target path by the one or more processors: calculating a distance until shifting of the moving body to an asymptotic-orbit returns the moving body to the target path by turning the moving body, at each of one or more candidate center-of-gravity velocities of the moving body, based on a position of the moving body and an angle between a moving direction of the moving body and the target path; determining a target center-of-gravity velocity of the moving body from the one or more candidate center-of-gravity velocities based on the calculated distance and controlling the moving body to return to the target path.

9. The control apparatus according to claim 8, wherein the one or more processors determine, as the target center-of-gravity velocity of the moving body, a candidate center-of-gravity velocity with the calculated distance being within a predetermined threshold among the one or more candidate center-of-gravity velocities.

10. The control apparatus according to claim 8, wherein the moving body includes a pair of driving wheels arranged with axles of the respective driving wheels passing through the center of gravity of the moving body, and the one or more processors shift the moving body to the asymptotic-orbit when an offset value indicating a velocity difference between the driving wheels is inverted in terms of positive/negative.

11. The control apparatus according to claim 10, wherein the offset value is calculated based on a distance between the moving body and the target path, and the angle.

12. The control apparatus according to claim 10, wherein the velocity of each of two driving wheels constituting the pair of driving wheels is calculated based on a center-of-gravity velocity of the moving body and the offset value.

13. The control apparatus according to claim 8, wherein the one or more processors repeatedly calculate the position and the angle of the moving body in a predetermined time cycle to calculate the distance until shifting of the moving body returns the moving body to the asymptotic-orbit.

14. The control apparatus according to claim 8, wherein the moving body is a transport robot configured to transport goods.

15. A moving body control method performed by a computer to control a moving body to follow a target path, wherein the moving body deviates from the target path to avoid and obstacle and returns to the target path by the control performing the moving body method, the moving body method comprises: calculating a distance until shifting of the moving body to an asymptotic-orbit returns the moving body to the target path by turning the moving body, at each of one or more candidate center-of-gravity velocities of the moving body, based on a position of the moving body and an angle between a moving direction of the moving body and the target path; determining a target center-of-gravity velocity of the moving body from the one or more candidate center-of-gravity velocities based on the calculated distance and the angle; and controlling the moving body to return to the target path.

16. The moving body control method according to claim 15, wherein determining the target center-of-gravity velocity includes determining, as the target center-of-gravity velocity of the moving body, a candidate center-of-gravity velocity for which the calculated distance is within a predetermined threshold among the one or more candidate center-of-gravity velocities.

17. The moving body control method according to claim 15, wherein the moving body includes a pair of driving wheels arranged with axles of the respective driving wheels passing through center of gravity of the moving body, and the computer controls the moving body to shift to the asymptotic-orbit when an offset value indicating a velocity difference between the driving wheels is inverted in terms of positive/negative.

18. The moving body control method according to claim 17, wherein the offset value is calculated based on a distance between the moving body and the target path, and the angle.

19. The moving body control method according to claim 17, wherein the velocity of each of two driving wheels constituting the pair of driving wheels is calculated based on a center-of-gravity velocity of the moving body and the offset value.

20. The moving body control method according to claim 15, wherein the angle of the moving body are repeatedly calculated in a predetermined time cycle to calculate the distance until shifting of the moving body returns the moving body to the asymptotic-orbit.

* * * * *